US012613966B2

(12) United States Patent
Altick et al.

(10) Patent No.: US 12,613,966 B2
(45) Date of Patent: Apr. 28, 2026

(54) ATTESTATION OF A DEVICE UNDER TEST

(71) Applicant: BAE Systems Space & Mission Systems Inc., Broomfield, CO (US)

(72) Inventors: Christopher Altick, Kettering, OH (US); Amy Sue Christopher, Miamisburg, OH (US); Kathleen Jo Frazier, Dayton, OH (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 177 days.

(21) Appl. No.: 18/369,938

(22) Filed: Sep. 19, 2023

(65) Prior Publication Data

US 2024/0143766 A1 May 2, 2024

Related U.S. Application Data

(60) Provisional application No. 63/421,658, filed on Nov. 2, 2022.

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ........................... G06F 21/57; G06F 2221/034
See application file for complete search history.

(56) References Cited

U.S. PATENT DOCUMENTS

| | | | |
|---|---|---|---|
| 9,369,484 B1 | 6/2016 | Lacerte et al. | |
| 10,182,065 B1 | 1/2019 | Ryon et al. | |
| 10,523,688 B1 | 12/2019 | Ryon et al. | |
| 10,546,130 B1 | 1/2020 | Chaney | |
| 11,010,268 B1 | 5/2021 | Chaney | |
| 11,086,997 B1 | 8/2021 | Stephenson et al. | |
| 11,347,841 B1 | 5/2022 | Bean et al. | |
| 11,514,168 B2 | 11/2022 | Stephenson et al. | |
| 2002/0073375 A1 | 6/2002 | Hollander | |
| 2015/0012237 A1 | 1/2015 | Balog et al. | |
| 2020/0110879 A1* | 4/2020 | Linton | G06F 21/575 |
| 2023/0042055 A1 | 2/2023 | Stephenson et al. | |

OTHER PUBLICATIONS

International Search Report and Written Opinion for International (PCT) Patent Application No. PCT/US23/74605, dated Dec. 12, 2023 14 pages.
International Preliminary Report on Patentability for International (PCT) Patent Application No. PCT/US2023/074605, dated May 15, 2025 8 pages.

* cited by examiner

*Primary Examiner* — Beemnet W Dada

(74) *Attorney, Agent, or Firm* — Sheridan Ross P.C.

(57) ABSTRACT

Attestation of an electronic device provides assurances that the device is trustworthy and operating as intended or, at least, within acceptable parameters. Methods and systems are provided herein wherein a device under test (DUT) is subject to tests, the results of which are provided to a trust verifier (TV) to indicate whether the DUT passed or failed. To protect the integrity of the test from being discovered by malware, the test logic is developed "off board" and only machine code is provided to the DUT. Similarly, memory values and other data of the DUT are not revealed to the TV, which is only provided with test results.

22 Claims, 10 Drawing Sheets

ATTESTATION OF A DEVICE UNDER TEST

CROSS-REFERENCE TO RELATED APPLICATION

This application claims the benefit of U.S. Provisional Patent Application No. 63/421,658, filed Nov. 2, 2022, the entire content of which is incorporated herein by reference.

FIELD

The invention relates generally to systems and methods for performing device attestation and particularly to performing attestations while preserving private data of a tester and of the target device.

BACKGROUND

Attestation is a process wherein the integrity of a device is determined. The device may be entirely or partially electronic and have a potential to be compromised either by age or malware. Aging, such as a number of heat-cool cycles, power on-off cycles, pressurization-depressurization, harsh environments, etc., may cause a portion of the device to partially fail in a manner that allows the device as a whole to keep operating, but in an impaired state, such as operating more slowly or utilizing redundant portions that would otherwise be idle or used for other purposes. A device that comprises software or hardware may be compromised by malware. Malware may be present on the device due to the act of a nefarious actor. Malware may attempt to alter the operation of the device or gather information to be retrieved or reported back to the nefarious actor.

Malware may have features in place to thwart detection. Therefore, it is often important to have very detailed information about the device's inner workings, such as interfaces, algorithms, and subcomponents. Such information is often proprietary or confidential and the device's owner may be unable or unwilling to provide such information. Similarly, attestation developers may have proprietary or confidential methodologies developed to detect the presence of malware; learning these methodologies may also be a target of malware.

The device and attestation equipment often have different controlling entities. For example, the device may be a component of an aircraft that, by definition, is mobile and subject to security risks associated with mobility. Other devices are stationary but may be subject to compromise by personnel who are either entirely unauthorized or authorized for a different purpose that allows physical or networked access to the device, such as at a power plant.

If a device is tested and found to be absent malware or other impairments, the attestation process is successful, and the device may be put into service. Otherwise, if the device fails such tests, attestation is denied, and the device may be flagged as impaired or removed from service.

SUMMARY

Embodiments of the present disclosure provide systems and methods for performing attestation of cyber physical systems. More particularly, systems and methods, implemented through the execution of a third-party software program, are provided that enable software of a cyber physical system, also referred to herein as an embedded system, to prove its identity. Embodiments of the present disclosure can be applied in connection with any embedded system, including systems provided on or as part of mobile platforms or devices, such as spacecraft, aircraft, ships, or other vehicles, as part of stationary installations, such as power plants, refineries, or factories, or as part of devices, such as healthcare devices, communication devices, and audiovisual devices.

Systems in accordance with embodiments of the present disclosure can include a device under test and a trusted verifier. The device under test includes operational programming and a loader or attestation core. The trusted verifier includes a test script. In addition, the device under test and the trusted verifier include communication interfaces to enable communications between the device under test and the trusted verifier.

Methods in accordance with embodiments of the present disclosure include embedding a loader or attestation core in the device under test. In addition, a test binary module, created by the developer or operator of the device under test, is loaded into the device under test to execute tests or test scripts directly or by loading a test manager. The test manager may then be executed and a test performed thereunder. Test results and/or test inputs may be exchanged via a communication interface established between the trusted verifier and the device under test. The communication interface established with the device under test may be provided by the test binary or test manager that excludes exposing any private, and therefore protected, features of the device under test to the trusted verifier. Private data may include sensitive data, operational characteristics of the device under test or a component thereof, proprietary interfaces, proprietary logic, etc. Tests may be performed on the private features and a result of the test obtained that omits the private data. Once testing has concluded, the trusted verifier generates a summary status, such as "pass" or "fail," and the device under test is rebooted to remove the content loaded by the trusted verifier from the memory of the device under test.

Attestation systems and methods are needed to evaluate a device under test (DUT) that are developed and executed while avoiding exposure of proprietary details of the DUT to a trust verifier (TV).

Additional features and advantages of embodiments of the present disclosure will become more readily apparent from the following description, particularly when considered together with the accompanying drawings.

DETAILED DESCRIPTION

Figure 1:
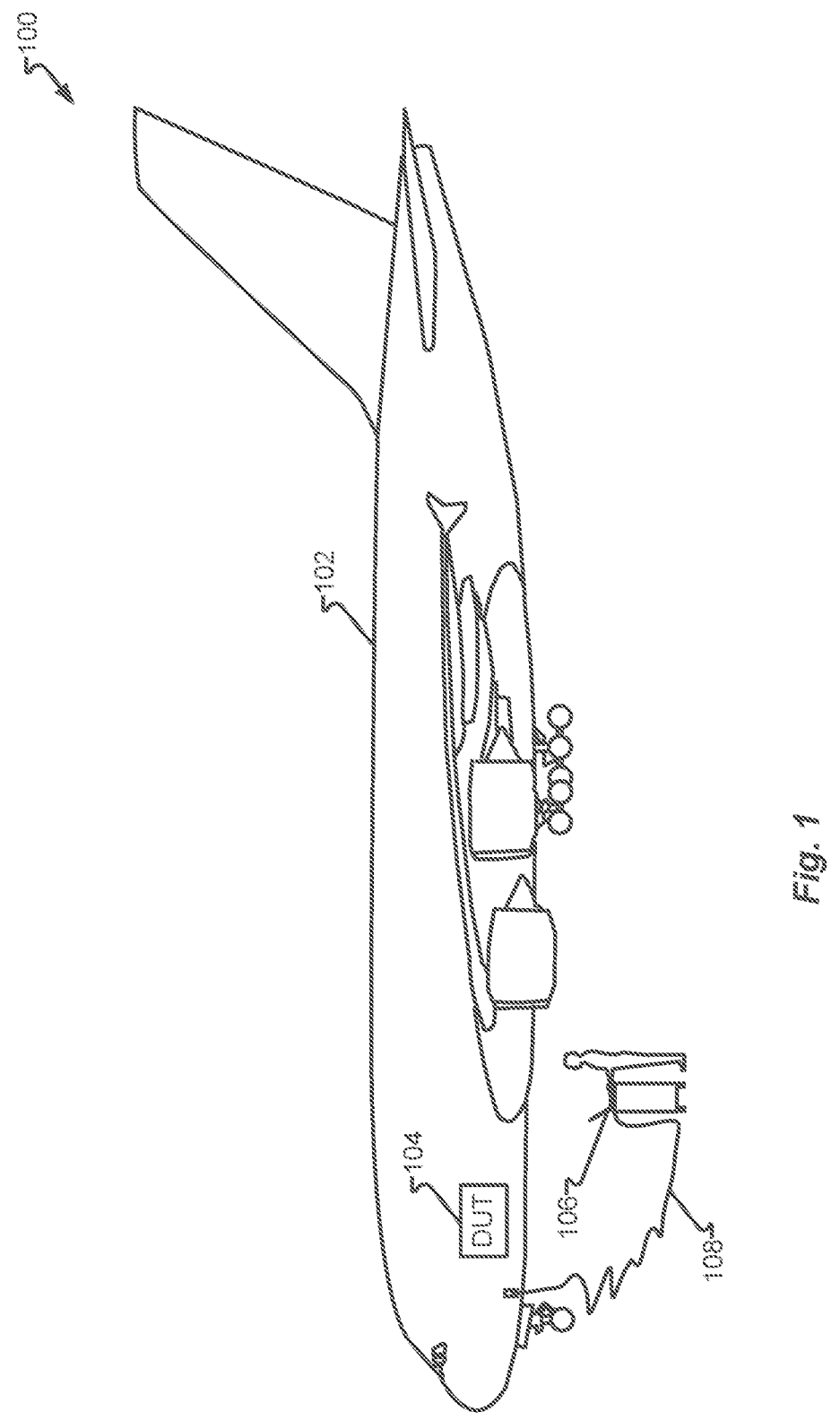
FIG. 1 depicts a system in accordance with embodiments of the present disclosure.

FIG. 1 depicts a system 100 in accordance with embodiments of the present disclosure. In one embodiment, a device under test (DUT) 104 is provided as part of or is a portion of a platform 102. In one embodiment, the platform 102 is an aircraft (illustrated), however, the platform 102 is variously embodied and may include, but is not limited to, other vehicles (e.g., surface, space, marine, submarine, etc.) medical equipment, controlled facility (e.g., factory, data center, power plant, etc.) etc. The device under test 104 performs a function of or is associated with the platform 102. The function can include, but is not limited to, control of one or more components of the platform 102, security, communications, backup/redundancy, etc.

The device under test 104 comprises at least one of a computer memory. A computer memory may be altered remotely (e.g., via a network) or locally, such as via the attachment of a portable memory device, to the device under test 104. Additionally, fixed memory, such as "Flash" memory, electrically erasable programmable read only memory (EEPROM) or other non-volatile memory or microcode, may be altered with respect to the device under test 104 via physical access to add and/or remove a component to/from the device under test 104. The alteration of the device under test 104 may be done with nefarious motivations or innocently (e.g., the authorized installation of hardware and/or software that is unknowingly compromised). If the device under test 104 is compromised with malware, then there may be a risk to people, property, and information.

It should also be appreciated that the device under test 104 may become compromised through means other than malware, such as due to the presence of a foreign object (e.g., a loose screw creating a short circuit) or damage. Damage at a microscopic scale is generally synonymous with aging. Damage may be caused by excessive physical force or other exposure (e.g., radiation, electromagnetic, moisture, temperature, voltage, etc.) which may occur as a single event or cumulatively.

To ensure the trustworthiness of the device under test 104, a trusted verifier 106 performs or causes a number of tests to be performed on the device under test 104. The results of those tests may be summarized as a pass-fail determination, or attestation, of the device under test 104. The goal of attestation is to prove to a party that the boot loader, root file systems, operating system, application software, non-volatile data, and other aspects of the device under test 104 are intact and trustworthy.

Accordingly, and in another embodiment, the trusted verifier 106 is connected to the device under test 104 via the network 108. As described more completely with respect to FIG. 7, the network 108 may be embodied to include a physical connection, such as a cable (illustrated in FIG. 1) or other wired and/or wireless connections. Once connected, the trusted verifier 106 executes instructions to test the device under test 104 and draw a conclusion from the results of the tests whether the device under test 104 is trusted or not. If not trusted, the device under test 104 may be removed from service or allowed to operate in an impaired capacity (e.g., output therefrom is received but not relied upon, one or more features are disabled, etc.). If trusted, the device under test 104 is able to be placed in service with confidence that it will perform as designed.

Providing the device under test 104 with network connectivity, such as to the Internet, would provide certain benefits, such as ease of obtaining updates or new information. However, network connectivity, especially to a public network (e.g., Internet) presents an attack surface that may be exploited. In another embodiment, set-based attestation is provided wherein the device under test 104 omits network connectivity entirely or, at least, for the performance of an attestation. A set of tests is defined for a set of common hardware devices with the same configuration. In order to determine the hardware and software of the device under test 104, each device under test will have a Global Unique Identification (GUID) generated from a hash of inputs for the hardware and software, including version numbers, sub-features, etc.

When a hardware or software change is made to the device under test 104, a new attestation test set and GUID would be created and distributed via a compact disk or another secure method to the test stations, such as trusted verifier 106. Additionally or alternatively, if a particular device under test 104 has variable data in non-volatile memory, a test exclusion zone may be created. As a further alternative or option, if the device under test 104 has data in a non-volatile region of memory that is capable of executing code, a user-defined test may be created to test the region.

Figure 2:
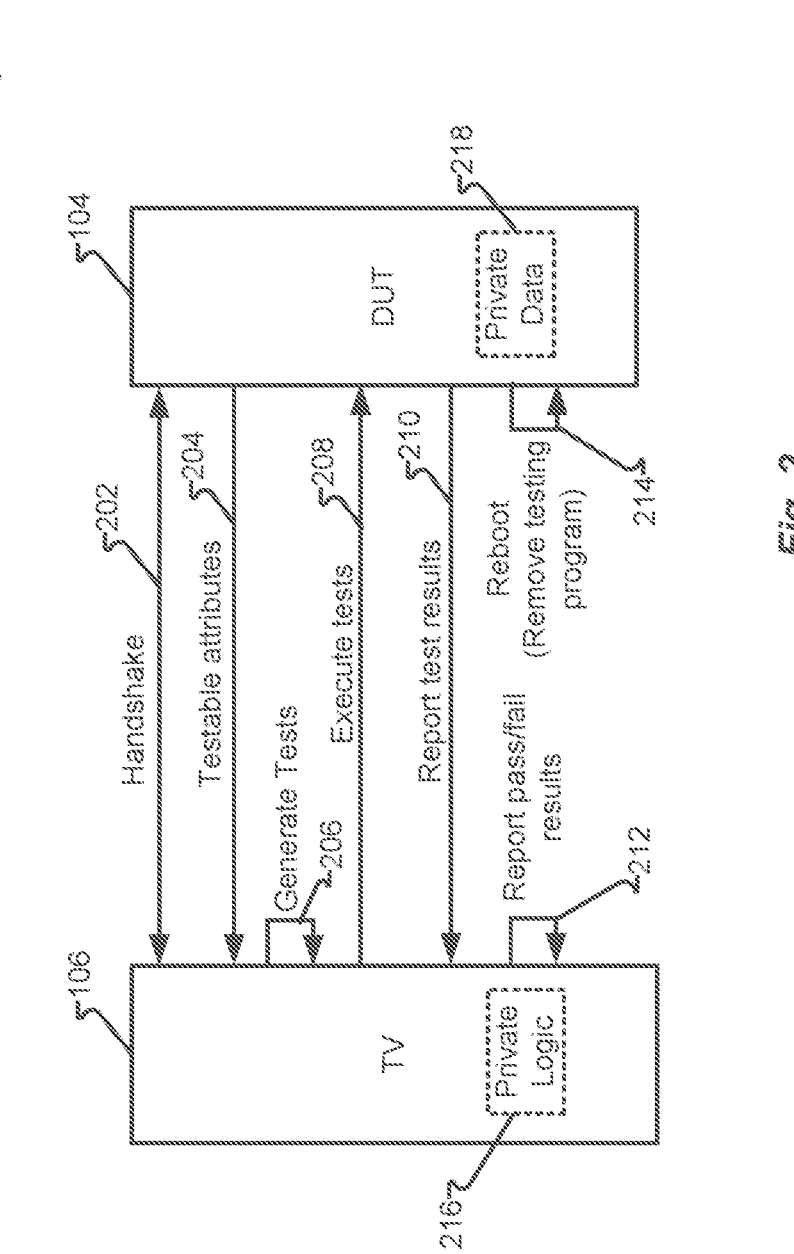
FIG. 2 depicts aspects of a system in accordance with embodiments of the present disclosure.

FIG. 2 depicts aspects of a system 200 in accordance with embodiments of the present disclosure. In one embodiment, the trusted verifier 106 is an "off board" verifier of the device under test 104. The trusted verifier 106 comprises private logic 216, such as algorithms, data, and data structures, used to select, configure, and/or order tests for the device under test 104 to perform and, if performed successfully, validate or attest as being trustworthy and operationally sound. Additionally, or alternatively, the tests may have at least one randomization. Randomization may include the ordering of the individual tests and/or the randomization of at least one test attribute, such as an input parameter of one or more tests. Randomizations of test parameters may be curtailed to use only valid entries or allow entries to vary outside what is expected to be provided and determine how device under test 104 responds to an unexpected input (e.g., providing "Yes" or "−9999" as the value for "fuel in pounds"). One advantage to physically separating the trusted verifier 106 and the device under test 104 is realized where the device under test 104 is often a component of the platform 102 that is mobile (e.g., an aircraft or other vehicle). In contrast, the trusted verifier 106 may be subject to more control, such as being limited to only authorized locations having security measures in place that may not exist in every location the mobile platform 102 may encounter.

The private logic 216 may represent one or more tests that are known to indicate the presence of malware or another defect in the device under test 104. In the case of malware, knowledge of these tests may allow future versions of the malware to better escape detection. A nefarious actor having access, even unlimited access, to the device under test 104 would find the contents of the private logic 216 completely absent.

Private data 218 may reside on the DUT 104 and comprise algorithms, interfaces, data, and data structures developed at a significant investment and may perform proprietary functions. For example, the device under test 104 may be optimized to perform a particular function, such as control the operation of an engine. Numerous inputs may be considered, and a particular algorithm embodied in the private data 218 may optimize, for example, fuel efficiency under a particular power requirement and atmospheric conditions for a specific make and model of aircraft.

A third party may perform attestation services related to the device under test 104. To protect the private data 218 from potential exposure to an unauthorized source having access to the trusted verifier 106, the private data 218 is not provided to the trusted verifier 106. As a result, the controlling party of the device under test 104 is aware of the testable attributes of the device under test 104 and that such attributes will, or may be, the subject of testing, however, the controlling party of device under test 104 may not be provided with test details and may remain unaware of the actual tests (e.g., the private logic 216).

In another embodiment, the trusted verifier 106 is connected to the device under test 104 such as via the network 108 enabling communications therebetween. Once the trusted verifier 106 and the device under test are connected, a communication exchange 202 may take place. The communication exchange 202 performs a "handshake" operation wherein each of the trusted verifier 106 and device under test 104 notifies the other that they are connected, and that testing may proceed. The exchange 202 may cause the trusted verifier 106 to determine if a prior history is available for the particular device under test 104.

If a prior history is absent or a new baseline is desired, the device under test 104 provides the trusted verifier 106 with testable attributes in a test attribute exchange 204. If a prior history is to be used, then the test attribute exchange 204 may be altered to more quickly determine if the stored testable attributes match those of the device under test 104, such as by performing tests on a checksum, hash, spot checking a subset of testable attributes, verifying a version number of the testable attributes, etc. The testable attributes may comprise any, and preferably all, portions of the device under test 104 that have a potential to be compromised due to age or malware. Portions of the device under test 104 not tested by the trusted verifier 106 may be tested by other equipment and methodologies.

The test attribute exchange 204 includes an enumeration of the hardware, software, parameters, and/or other testable devices attached to the device under test 104. Parameters may include a "watch dog" timer requirement to measure the time utilized for the device under test 104 to perform an operation (e.g., one or more tests) and/or the time available to perform such an operation.

Next, the trusted verifier 106 utilizes the testable attributes in a learning phase, which may comprise utilization of the private logic 216, to automatically generate a set of tests in a test generation operation 206. Additionally, or alternatively, the test generation operation 206 may derive a test of the testable attributes themselves and, in a future attestation, utilize the tests to determine if there has been any subsequent change in the testable attributes. If so, the device under test 104 may be identified as being potentially compromised and failing attestation. The test generation operation 206 may be omitted if such tests are already known, such as from a prior test generation operation 206, and a new baseline of tests unwarranted.

A test provisioning exchange 208 and a results return exchange 210 may be performed as single operations wherein all tests are provided in the exchange 208 and then all results are returned in the test generation operation 206. In other embodiments, multiple test provisioning exchange 208 and the results return exchange 210 operations may be performed, such as to execute one test (as part of one test provisioning exchange 208) and obtain the results therefrom (through one results return exchange 210), which then may be repeated for each test. Optionally, the test generation operation 206 may consider a result obtained from one results return exchange 210 and provide a test in a test provisioning exchange 208 derived from the result. It should be appreciated that combinations of the foregoing or other aggregation of tests may also be utilized. While the exchange 208 may also include specific tests, the exchange 208 may include scripts or programs comprising tests and/or computer instructions for a processor of the device under test 104 to execute, such as for the processing of intermittent test results or the timing of when to perform a particular test.

Testing is complete once all tests have been performed and results obtained. Alternatively, testing may be completed upon at least one test result indicating a failure (e.g., device under test 104 is unsound or untrustworthy) and omitting any remaining tests. If testing is interrupted for any reason, testing may be considered complete and the device under test 104 identified as untested or unattested.

When testing is complete, the trusted verifier 106 performs a report operation 212, indicating whether the device under test 104 passed or failed attestation. As a result, the device under test 104 may be considered trustworthy and sound and placed into service. Otherwise, the device under test 104 may be considered compromised and removed from service or operated in a compromised mode (e.g., allowed to operate but operations of the device under test 104 are treated as unreliable and other precautions taken to protect people, property, and information).

Additionally, once testing is complete, a reboot operation 214 initiated by the trusted verifier 106 and/or the device under test 104 is performed. The Reboot operation 214 results in the loss of stored contents in volatile memory and then restarts. Optionally, the reboot operation 214 may perform a shut down and not automatically restart, such as to be restarted at a later time. As a result, any testing programs or data are removed.

Figure 3:
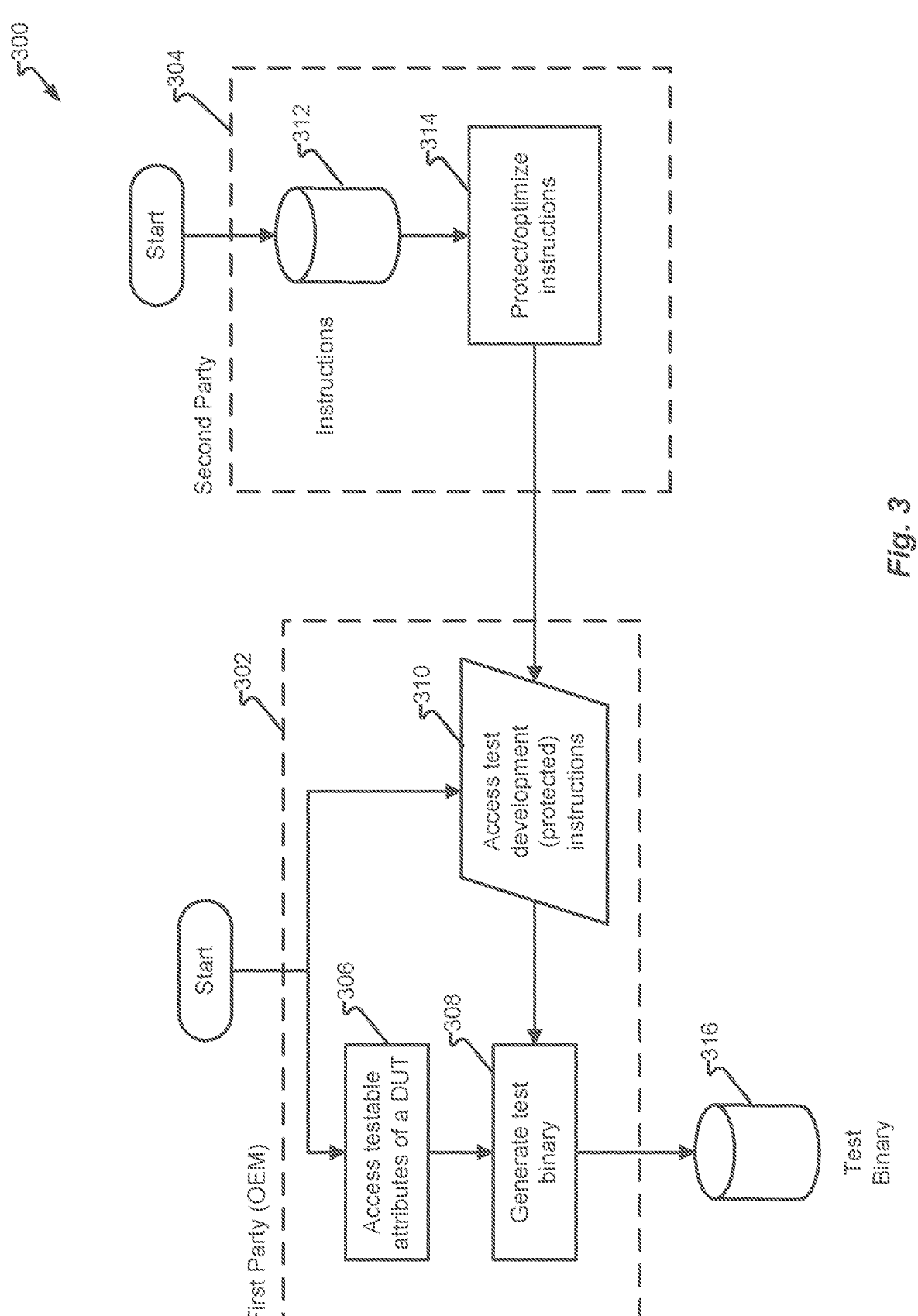
FIG. 3 depicts aspects of a system in accordance with embodiments of the present disclosure.

FIG. 3 depicts aspects of a system 300 in accordance with embodiments of the present disclosure. To attest to the trustworthiness of the device under test 104, details of the hardware and software installed or connected to the device under test 104 need to be known. Similarly, testing methodologies or specific tests also need to be known. A nefarious actor having access to the hardware and software details of the device under test 104 may be able to design malware or unauthorized hardware in a way that mimics legitimate hardware and software or otherwise leverages such information to exploit the device under test 104. The device under test 104 may have vulnerabilities, such as "zero-day exploits" (e.g., vulnerabilities that are not known to exist by authorized parties but are known to a nefarious actor). Accordingly, by not providing details of the device under test 104 outside of a first party 302, such as an original equipment manufacturer (OEM), the potential attack surface (e.g., portions of the device under test 104 that may be compromised) is reduced.

Similarly, another attack surface exists with potential exposure of the testing methodologies and specific tests utilized to perform an attestation of the device under test 104. By limiting the details of the testing process to only those authorized (e.g., within a second party 304), a nefarious actor, even one with access to the device under test 104, may be unaware of the tests that the device under test 104 will be subject to. As a result, malware designed to avoid detection is less likely to do so successfully.

In one embodiment, the first party 302, for example the OEM or other party having control of persistent aspects (e.g., ROM, installed components, etc.), accesses testable attributes of the device under test 104 in step 306. Accessing the testable attributes may comprise discovering testable attributes with logic probes or other investigatory equipment and/or accessing design or operational descriptors of the device under test 104, such as may be stored in a data repository (not shown). In step 310 the first party 302 accesses test development rules and private instructions provided by the second party 304 to generate a test binary

316 in step 308. Step 308 may comprise providing details of the testable attributes accessed in step 306 or indicia thereof. For example, the device under test 104 may comprise "a memory" and step 308 then generates tests to determine the trustworthiness of the memory. In other embodiments, specific details of the memory, or other portion of the device under test 104, may be provided and test selected in step 308 for those specific details. Once generated, test binary 316 is maintained in a media or data storage or otherwise made available to load into the trusted verifier 106 and perform tests on the device under test 104.

Returning to the right-hand portion of FIG. 3, the second party 304 accesses a set of instructions from instructions 312. The set of instructions in instructions 312 may comprise testing methodologies, specific tests, and optimizations that may include, in whole or in part, hardware independent instructions. Step 314 provides an optimized and private set of instructions, such as encrypted code or machine code that cannot be de-compiled into instructions 312. As a result, step 310, which may be embodied as a software development kit, is provided by the second party 304 without knowledge of the device under test 104. Step 308 generates test binary 316 as a combination of testable attributes, known to the first party 302 and not known to the second party 304, and test development instructions accessed in step 310. Accordingly, step 308 may allow the first party 302 to provide the testable attributes to allow for tests or testing methodologies to be selected from the instructions accessed in step 310. For example, step 308 may be performed by the first party 302 to develop test binary 316 for a device that is entirely computational (e.g., only data inputs and outputs). As a result, step 308 selects appropriate tests for such a device (e.g., providing inputs and comparing the output to a reference output value). Tests that are known to be irrelevant, such as those that would apply to test a mechanical portion of a device having a mechanical output (e.g., motor, valve, servo, etc.), are not selected. The details of such tests (e.g., a human-readable form) is unavailable to the first party 302. Similarly, the second party 304 is not provided with tests which were selected for a particular device under test 104.

As a result, test binary 316 is generated using the private data 218 of either the first party 302 or the private logic 216 of the second party 304. However, test binary 316 maintains the private data 218 in an obfuscated form or does not maintain the private data 218. It should be appreciated that other data and logic may be utilized and may be similarly obfuscated.

Figure 4A:
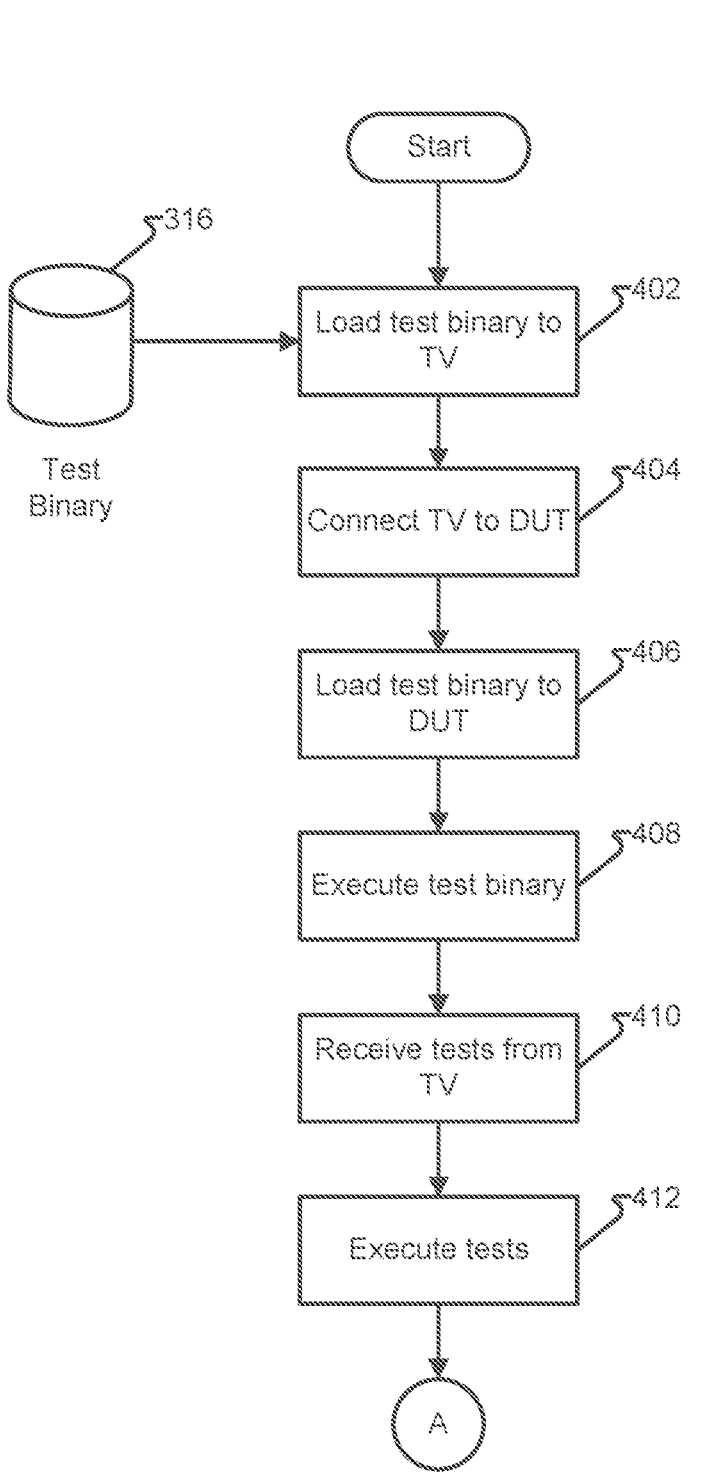
FIGS. 4A and 4B depict an interaction in accordance with embodiments of the present disclosure.
Figure 4B:
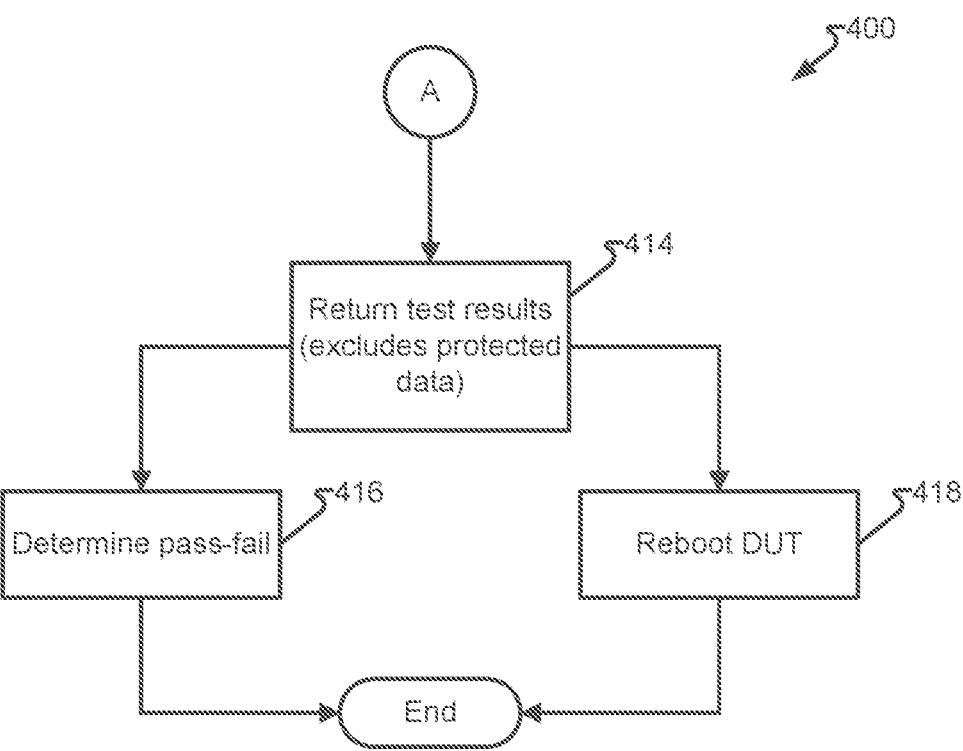

FIGS. 4A and 4B depict a process 400 in accordance with embodiments of the present disclosure. In one embodiment, process 400 begins and, in step 402, test binary 316 is loaded to the trusted verifier 106. Subsequently, in step 404, the device under test 104 is connected to the trusted verifier 106 and consequently test binary 316 is loaded to the device under test 104 in step 406.

In step 408, the device under test 104 then executes test binary 316. Test binary 316, now loaded to the device under test 104, then performs step 410 which receives tests from the trusted verifier 106 for execution in step 412. Test results (excluding private data) are returned from the device under test 104 to the trusted verifier 106 in step 414.

In step 416 the trusted verifier 106 uses the test results from step 414 to make a pass-fail determination. In step 418, the device under test 104 is rebooted (automatically shut down and restarted) or optionally automatically shut down but not restarted, such as to be available to be restarted at a later time. As a result of step 418, test binary 316 and any other artifacts of the tests are removed.

Figure 5A:
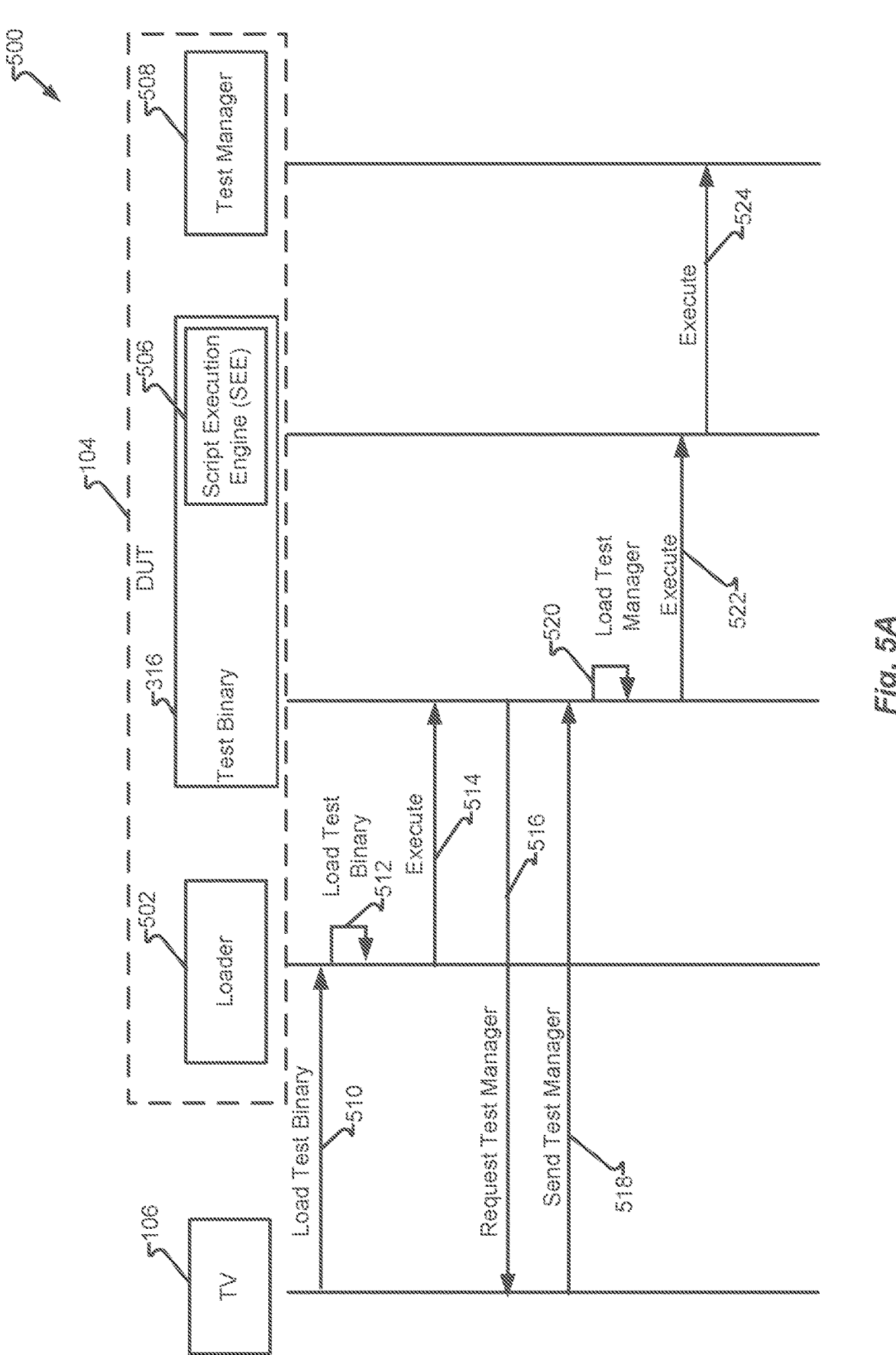
FIGS. 5A and 5B depict an interaction in accordance with embodiments of the present disclosure.
Figure 5B:
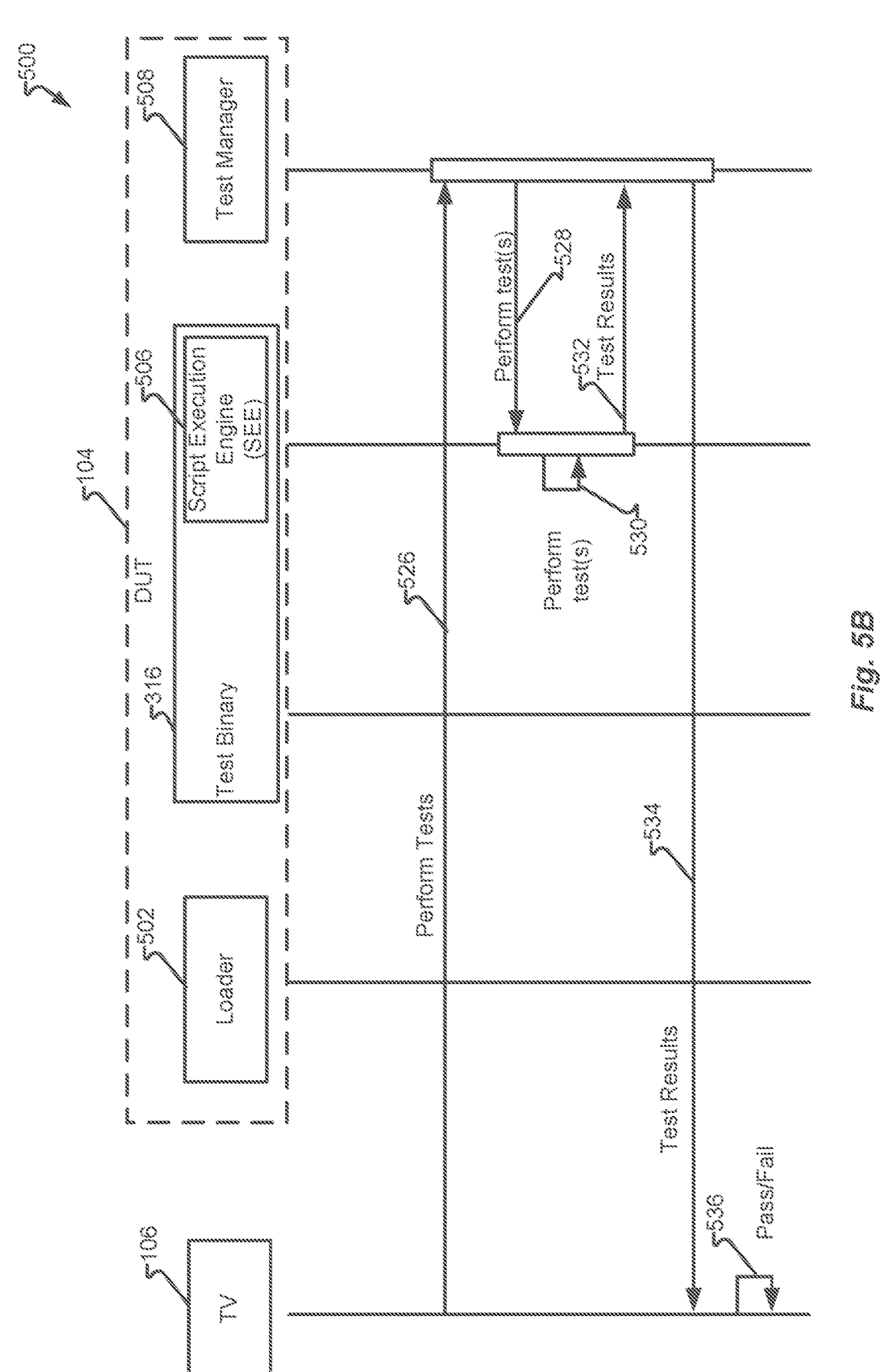

FIGS. 5A-5B depict a trust interaction 500 in accordance with embodiments of the present disclosure. In one embodiment, the trust interaction 500 includes an exchange of data and operations of the trusted verifier 106 and the device under test 104 wherein the trusted verifier 106 determines whether the device under test 104 is trustworthy. The trust interaction 500 provides descriptions that may be similar, identical, additional, or alternative to those provided in the description with respect to the system 200 (see FIG. 2). The device under test 104 may be embodied as having a single module utilized for attestation or a plurality of modules, such as a data loader 502, a test binary 316, a script execution engine (SEE) 506, and a test manager 508. In other embodiments, more or fewer modules or different arrangements thereof may be provided.

In one embodiment, the trusted verifier 106 and the device under test 104 are connected, such as via the network 108, and the trust interaction 500 begins. In step 510, the data loader 502 receives test binary 316 from the trusted verifier 106 and, in step 512, loads test binary 316 into a volatile memory location of the device under test 104. Step 514 then executes test binary 316. In one embodiment, test binary 316 includes a module that executes and performs the execution of test scripts, or tests. For example, test binary 316 may include the script execution engine 506 that is executed by the device under test 104 and then executes the instructions of a script that is, or comprises, one or more tests of the device under test 104. The particular tests to be performed may be embodied with script execution engine 506.

Next, in step 516, test binary 316 requests the test manager 508 which is provided by the trusted verifier 106 in a step 518. A step 520 then loads the test manager 508 into volatile memory of the device under test 104. Once loaded, the test manager 508 is executed. Execution may be a direct execution of the test manager 508 or, as illustrated, test binary 316 calls the script execution engine 506 in a step 522 and, in a step 524, the script execution engine 506 executes the test manager 508.

The trusted verifier 106 then causes the test manager 508 to perform tests. One of ordinary skill in the art will appreciate that the order of steps 526 and 528 may be grouped, separated, altered, truncated, or extended. For example, the trusted verifier 106 may load or trigger a plurality of tests in step 526 and receive results in step 534 for the plurality of the tests as a single result (e.g., "all passed," "at least one failure," etc.). Similarly, one or more tests and results may be loaded or triggered in step 526 and results obtained in step 534 for an individual test (or a group of less than all tests) and repeated for subsequent tests, such as when one test result is used to determine a subsequent test or whether one or more subsequent tests are to be performed and the results reported in step 534.

Step 526 may present a menu or other indicia of a set of tests to be selected and performed in steps 528, 530, and 532. For example, trusted verifier 106 may select a particular set of tests in a particular order. Alternatively, trusted verifier 106 may instruct test manager 508 to select the tests and/or a particular order for the tests. The test order may be random, pseudorandom, or algorithmically selected. As a benefit, device under test 104 (which may have been compromised) cannot know prior to the tests what the order of the tests will be.

Test manager 508 loads, or otherwise makes available, one or more tests to the script execution engine 506 in step 528. In step 530, the script execution engine 506 executes the test and obtains a result in step 532. The result is reported back to the test manager 508 and the device under test 104 in step 534. Steps 528, 530, and 532 may be performed in a single pass with one or more tests or iteratively or recursively. A test result may be an actual reported result and/or the timing of when the result was obtained from test 104 versus the time expected for test 104 to return the result.

Test results may be in the form of a particular value (e.g., a result of a mathematical operation) or indicia of the result (e.g., pass, fail, etc.). Once tests are complete, step 536 reports the result, such as a pass/fail or result attribute (e.g., "memory 3.1% unreliable").

Figure 6A:
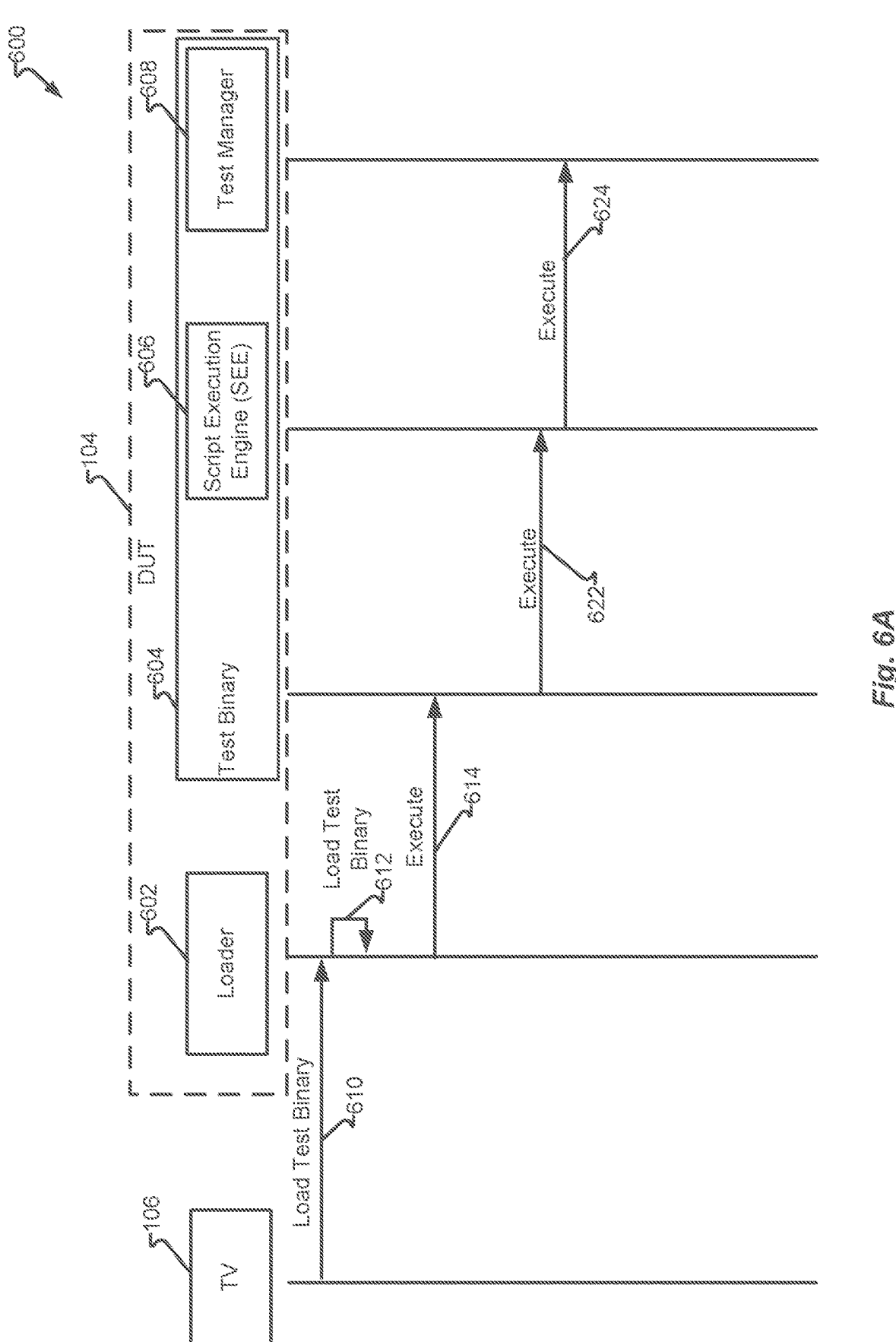
FIGS. 6A and 6B depict an interaction in accordance with embodiments of the present disclosure.
Figure 6B:
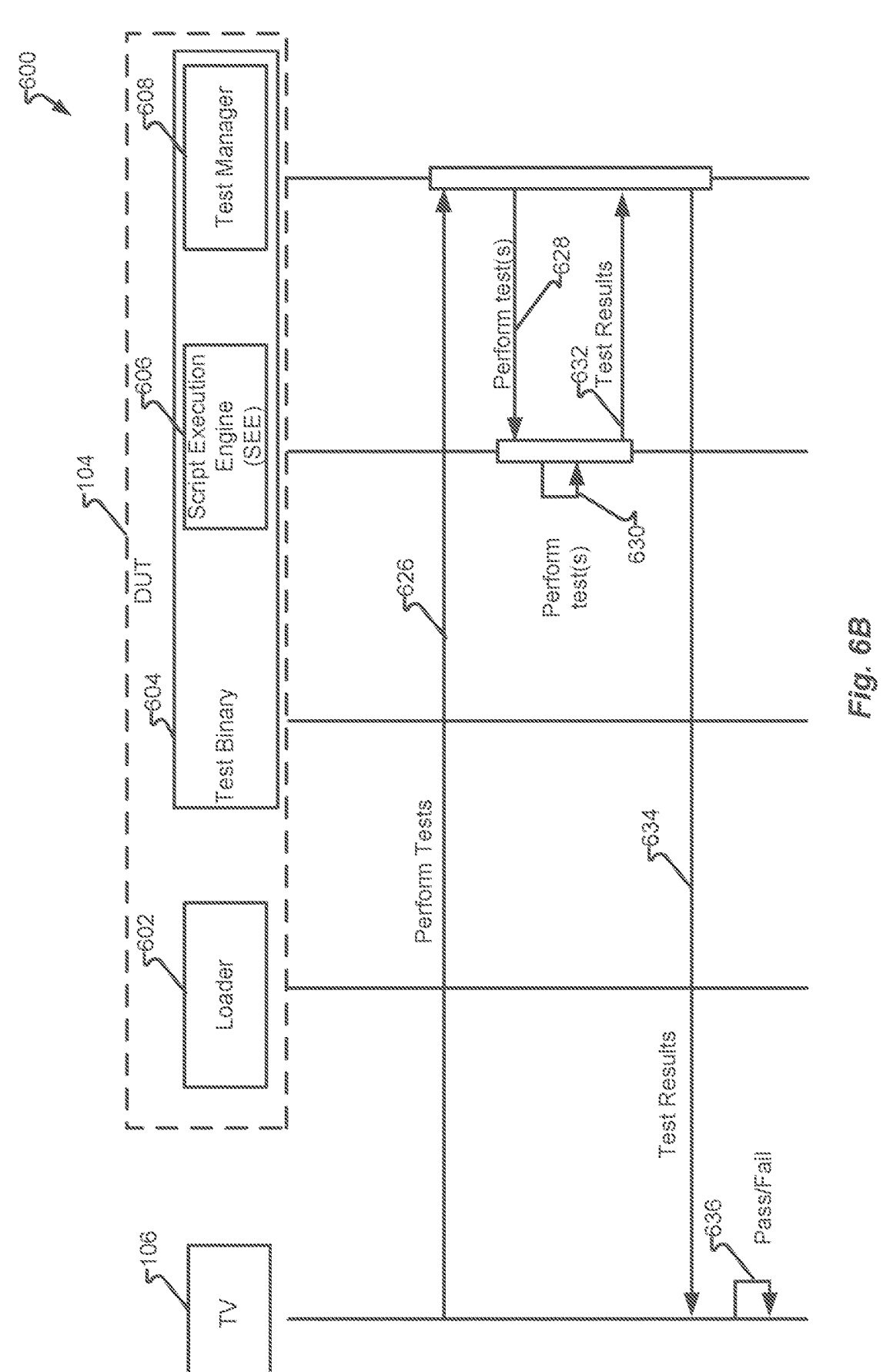

FIGS. 6A-6B depict a trust interaction 600 in accordance with embodiments of the present disclosure. In one embodiment, the trust interaction 600 includes an exchange of data and operations of the trusted verifier 106 and the device under test 104 wherein the trusted verifier 106 determines whether the device under test 104 is trustworthy. Trust interaction 600 provides descriptions that may be similar, identical, additional, or alternative to those provided in the description with respect to the system 200 (see FIG. 2). The device under test 104 may be embodied as having a single module utilized for attestation or a plurality of modules, such as a data loader 602, a test binary 604, a script execution engine (SEE) 606, and a test manager 608. Test binary 604 is substantially embodied as test binary 316 except as described with respect to test binary 604 and the embodiments of trust interaction 600. In other embodiments, more or fewer modules or different arrangements thereof may be provided. In particular, a test manager, such as a test manager having testing functionally substantially similar to test manager 508 (see FIG. 5), is incorporated into test manager 608. In another embodiment, the test manager 608 is a portion of test binary 604.

In one embodiment, the trusted verifier 106 and the device under test 104 are connected, such as via the network 108, and the trust interaction 600 begins. In step 610, the data loader 602 receives test binary 604 from the trusted verifier 106 and, in step 612, loads test binary 604 into a volatile memory location of the device under test 104. Step 614 then executes test binary 604. In one embodiment, test binary 604 includes a module that executes and performs the execution of tests, or other test programs (executables). For example, test binary 604 may include the script execution engine 606 that is executed by the device under test 104 and then executes the instructions of a script that is, or comprises, one or more tests of the device under test 104.

Once loaded, the test manager 608 is executed. Execution may be a direct execution of the test manager 608 or, as illustrated, test binary 604 calls the script execution engine 606 in step 622 and, in step 624, the script execution engine 606 executes the test manager 608.

Trusted verifier 106 then causes the test manager 608 to perform tests. One of ordinary skill in the art will appreciate that the order of steps 626 and 628 may be grouped, separated, altered, truncated, or extended. For example, trusted verifier 106 may load a plurality of tests in step 626 and receive a result in step 634 for individual ones of the plurality or for the plurality as a single result (e.g., "all passed," "at least one failure," etc.). Similarly, one or more tests and results may be loaded in step 626 and results obtained in step 634 and repeated, such as when one test result is used to determine a subsequent test.

The test may be, or may be included in, a script or other program. Scripting may manage the order, timing, or other aspects of test presentation to the device under test 104.

Accordingly, and in one embodiment, the test manager 608 loads, or otherwise makes available, one or more tests to the script execution engine 606 in step 628. In step 630, the script execution engine 606 executes the test and obtains a result in step 632. The result is reported back to the test manager 608 and the device under test 104 in step 634. Steps 628, 630, and 632 may be performed in a single pass with one or more tests or iteratively or recursively.

Test results may be in the form of a particular value (e.g., a result of a mathematical operation) or indicia of the result (e.g., pass, fail, etc.). Once tests are complete, step 636 reports the result, such as a pass/fail or result attribute (e.g., "memory 3.1% unreliable").

Figure 7:
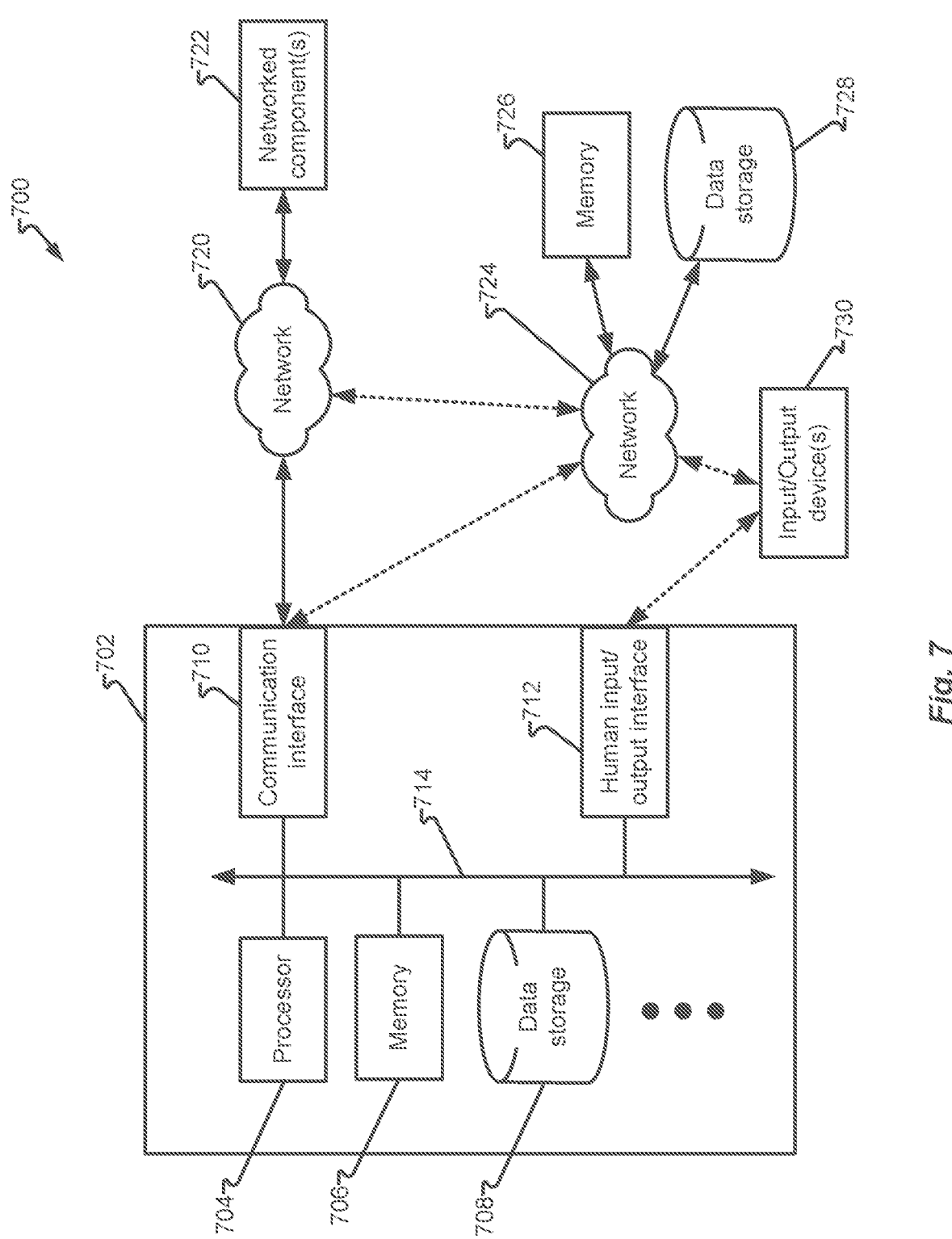
FIG. 7 depicts components of a device of a system in accordance with embodiments of the present disclosure.

FIG. 7 depicts device 702 in a system 700 in accordance with embodiments of the present disclosure. In one embodiment, the device under test 104 and/or the trusted verifier 106 may be embodied, in whole or in part, as the device 702 comprising various components and connections and/or connections to other components or systems. The components are variously embodied and may comprise a processor 704. The term "processor," as used herein, refers exclusively to electronic hardware components comprising electrical circuitry with connections (e.g., pinouts) to convey encoded electrical signals to and from the electrical circuitry.

The processor 704 may comprise programmable logic functionality, such as determined, at least in part, from accessing machine-readable instructions maintained in a non-transitory data storage, which may be embodied as circuitry, on-chip read-only memory, a computer memory 706, a data storage 708, etc., that cause the processor 704 to perform the steps of the instructions.

A computer-readable storage medium or, more simply, a "data storage" (e.g., data storage 708 and/or computer memory 706), may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an electrically erasable programmable read-only memory (EEPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

The processor 704 may be further embodied as a single electronic microprocessor or multiprocessor device (e.g., multicore) having electrical circuitry therein which may further comprise one or more control units, input/output units, arithmetic logic units, registers, primary memory, and/or other components that access information (e.g., data, instructions, etc.), such as received via a bus 714, execute instructions, and output data, again such as via the bus 714. In other embodiments, the processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that the processor 704 is a non-transitory computing device (e.g., electronic machine comprising circuitry and connections to communicate with other components and devices). The processor 704 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., the processor 704). the processor 704 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of the processor 704, the device 702 may utilize the computer memory 706 and/or the data storage 708 for the storage of accessible data, such as instructions, values, etc. A communication interface 710 facilitates communication with components, such as the processor 704 via the bus 714 with components not accessible via the bus 714. The communication interface 710 may be embodied as a network port, card, cable, or other configured hardware device. Additionally, or alternatively, a human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, the communication interface 710 may comprise, or be comprised by, the human input/output interface 712. The communication interface 710 may be configured to communicate directly with a networked component or configured to utilize one or more networks, such as a first network 720 and/or a second network 724.

The network 108 may be embodied, in whole or in part, as the first network 720. The first network 720 may be a wired network (e.g., peer-to-peer cable, data bus, Ethernet), wireless (e.g., WiFi, Bluetooth, cellular, etc.) network, or combination thereof and enable the device 702 to communicate with networked component(s) 722. In other embodiments, the first network 720 may be embodied, in whole or in part, as a telephony network (e.g., public switched telephone network (PSTN), private branch exchange (PBX), cellular telephony network, etc.).

Additionally, or alternatively, one or more other networks may be utilized. For example, the second network 724 may represent a second network, which may facilitate communication with components utilized by the device 702. For example, the second network 724 may be an internal network to a business entity or other organization, whereby components are trusted (or at least more so) than networked components 722, which may be connected to the first network 720 comprising a public network (e.g., Internet) that may not be as trusted.

Components attached to the second network 724 may include a computer memory 726, a data storage 728, the input/output device(s) 730, and/or other components that may be accessible to the processor 704. For example, the computer memory 726 and/or the data storage 728 may supplement or supplant the computer memory 706 and/or the data storage 708 entirely or for a particular task or purpose. As another example, the computer memory 726 and/or the data storage 728 may be an external data repository (e.g., server farm, array, "cloud," etc.) and enable the device 702, and/or other devices, to access data thereon. Similarly, the input/output device(s) 730 may be accessed by the processor 704 via the human input/output interface 712 and/or via the communication interface 710 either directly, via the second network 724, via the first network 720 alone (not shown), or via the second network 724 and the first network 720. Each of the computer memory 706, the data storage 708, the computer memory 726, the data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, the one input/output device 730 may be a router, a switch, a port, or other communication component such that a particular output of the processor 704 enables (or disables) the input/output device 730, which may be associated with the first network 720 and/or the second network 724, to allow (or disallow) communications between two or more nodes on the first network 720 and/or the second network 724. One of ordinary skill in the art will appreciate that other communication equipment may be utilized, in addition or as an alternative, to those described herein without departing from the scope of the embodiments.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Example embodiments may be configured according to the following:

(1) A trust verification system for attesting whether a device under test (DUT) is trustworthy, comprising:
a processor coupled with a computer memory comprising computer readable instructions; and
a communication interface; and wherein the processor performs:

upon being placed in communication with the DUT, via the communication interface, receiving testable attributes from the DUT;

generating, from the testable attributes, tests on the DUT;

loading the tests into an executable memory of the DUT;

loading a test manager into the DUT;

signaling the test manager to execute the tests; and receiving results from the test manager executing the tests.

(2) The system of (1), wherein the processor further analyzes the results and selectively provides or withholds attestation of the DUT, wherein the DUT is enabled for service when the attestation is provided and disabled from service when the attestation is withheld.

(3) The system of (1) or (2), wherein the DUT comprises a private computer memory maintaining proprietary data, and wherein the tests are generated to include at least one test of the private computer memory and the processor receives test results that are limited to indicia of success or failure of the at least one test.

(4) The system of any of (1) to (3), wherein the DUT comprises a private software application and wherein the tests are generated to include at least one test of the private software application and the processor receives test results that are limited to indicia of success or failure of the at least one test.

(5) The system of any of (1) to (4), wherein the processor generates a script to comprise the tests, and the script is generated to comprise at least one randomization of the tests therein, wherein the at least one randomization utilized to generate the script is unknown to the DUT.

(6) The system of (5), wherein the processor generates the script to comprise the at least one randomization of the order of the test therein.

(7) The system of (5), wherein the processor generates the script to comprise the at least one randomization of a test attribute of at least one test.

(8) The system of any of (1) to (7), wherein the processor generates the tests to comprise at least one test that further comprises a timing portion to measure the time utilized by the DUT to execute the at least one test and the results thereof include indicia of the time utilized.

(9) A method, comprising:

collecting testable attributes from a device under test (DUT);

generating, from the testable attributes, tests on the DUT;

loading the tests into an executable memory of the DUT;

loading a test manager into the DUT; and executing the test manager by the DUT to perform the tests and report results therefrom.

(10) The method of (9), wherein the DUT comprises a private computer memory and wherein the tests are generated to include at least one test of the private computer memory and report results that are limited to indicia of success or failure of the at least one test.

(11) The method of (9) or (10), wherein the DUT comprises a proprietary software application and wherein the tests are generated to include at least one test of the proprietary software application and report results that are limited to indicia of success or failure of the at least one test.

(12). The method of any of (9) to (11), wherein the tests are generated to comprise at least one randomization of the tests therein, wherein the at least one randomization utilized to generate the tests is unknown to the DUT.

(13) The method of any of (9) to (12), wherein the tests are generated to comprise the at least one randomization of the order of the test therein.

(14) The method of any of (9) to (12), wherein the tests are generated to comprise the at least one randomization of a test attribute of at least one test.

(15) The method of any of (9) to (14), wherein the tests comprise at least one test that further comprises a timing portion for the DUT to execute the at least one test and wherein the results include indicia of the time utilized to execute the at least one test.

(16) A device under test (DUT), comprising:

a processor coupled with a computer memory comprising computer readable instructions;

a communication interface to a network;

a volatile memory;

a data storage; and wherein the processor performs:

upon being placed in communication with a trust verifier (TV), via the communication interface, accessing testable attributes of the DUT from the data storage and sending the testable attributes to the TV;

in response to sending the testable attributes to the TV, receiving from the TV tests and a test manager, loading the tests and the test manager into the volatile memory, and executing the test manager; and upon receiving a signal from the test manager that the tests are finished, initiating at least one of a shutdown of the DUT or a reboot.

(17) The DUT of (16), further comprising:

a data loader; and wherein the processor, in response to sending the testable attributes to the TV, executes the data loader to perform the loading of the tests and the test manager into the volatile memory and executing the test manager.

(18) The DUT of (16) or (17), further comprising:

a private computer memory maintaining proprietary data; and wherein the processor provides at least one attribute of the private computer memory as a portion of the testable attributes; and wherein the test manager is generated to permit at least one test of the private computer memory and output test results exclusively limited to indicia of success or failure of the at least one test.

(19) The DUT of any of (16) to (18), further comprising:

a private software application; and wherein the processor provides at least one attribute of the private software application as a portion of the testable attributes; and wherein the test manager is generated to permit at least one test of the private software application and output test results exclusively limited to indicia of success or failure of the at least one test.

(20) The DUT of (16) to (18), wherein the processor receives indicia of pass or fail from the TV and, in accordance with the indicia of pass or fail, selectively enables or disables a function of the DUT.

(21) The system of (6) or (7) wherein the processor receives test results that are limited to indicia of success or failure of the at least one test.

(22) The system of (2), (3), (4), (5), (6), or (7) wherein the processor generates the tests to comprise at least one test that further comprises a timing portion to measure the time utilized by the DUT to execute the at least one test and the results thereof include indicia of the time utilized.

(23) The method of (9), (10), or (11), wherein the tests are generated to comprise at least one randomization of the tests therein, wherein the at least one randomization utilized to generate the tests is unknown to the DUT.

(24) The method of (9), (10), (11), (12), (13), or (14) wherein the tests comprise at least one test that further comprises a timing portion for the DUT to execute the at least one test and wherein the results include indicia of the time utilized to execute the at least one test.

(25) The method of (13) or (14) wherein the DUT comprises a proprietary software application and wherein the tests are generated to include at least one test of the proprietary software application and report results that are limited to indicia of success or failure of the at least one test.

(26) The DUT of (16) or (17), further comprising:

a private computer memory maintaining proprietary data; and wherein the processor provides at least one attribute of the private computer memory as a portion of the testable attributes; and wherein the test manager is generated to permit at least one test of the private computer memory and output test results exclusively limited to indicia of success or failure of the at least one test.

(27) The DUT of (17) or (18), further comprising:

a private computer memory maintaining proprietary data; and wherein the processor provides at least one attribute of the private computer memory as a portion of the testable attributes; and wherein the test manager is generated to permit at least one test of the private computer memory and output test results exclusively limited to indicia of success or failure of the at least one test.

(28) The DUT of (17), (18), or (19), wherein the processor receives indicia of pass or fail from the TV and, in accordance with the indicia of pass or fail, selectively enables or disables a function of the DUT.

What is claimed is:

1. A trust verification system for attesting whether a device under test (DUT) is trustworthy, comprising:

a processor coupled with a computer memory comprising computer readable instructions; and a communication interface;

wherein, while the processor of the trust verification system is in communication the DUT via the communication interface, the processor:

receives, via the communication interface, testable attributes from the DUT;

generates, from the testable attributes, tests for execution on the DUT;

loads the tests into an executable memory of the DUT;

loads a test manager into the DUT;

signals the test manager to execute the tests; and receives results from the test manager executing the tests.

2. The system of claim 1, wherein the processor further analyzes the results and selectively provides or withholds attestation of the DUT, wherein the DUT is enabled for service when the attestation is provided and disabled from service when the attestation is withheld.

3. The system of claim 1, wherein the DUT comprises a private computer memory maintaining proprietary data, and wherein the tests are generated to include at least one test of the private computer memory and the processor receives test results that are limited to indicia of success or failure of the at least one test.

4. The system of claim 1, wherein the DUT comprises a private software application and wherein the tests are generated to include at least one test of the private software application and the processor receives test results that are limited to indicia of success or failure of the at least one test.

5. The system of claim 1, wherein the processor generates a script to comprise the tests, and the script is generated to comprise at least one randomization of the tests therein, wherein the at least one randomization utilized to generate the script is unknown to the DUT.

6. The system of claim 5, wherein the processor generates the script to comprise the at least one randomization of an order of the test therein.

7. The system of claim 5, wherein the processor generates the script to comprise the at least one randomization of a test attribute of at least one test.

8. The system of claim 1, wherein the processor generates the tests to comprise at least one test that further comprises a timing portion to measure the time utilized by the DUT to execute the at least one test and the results thereof include indicia of the time utilized.

9. A method, comprising:

establishing communications between a trusted verifier and a device under test (DUT);

while the communications are established between the trusted verifier and the DUT:

collecting testable attributes from the DUT;

in response to collecting the testable attributes, generating, by the trusted verifier and from the testable attributes, tests for execution on the DUT;

loading the tests into an executable memory of the DUT;

loading a test manager into the DUT; and executing the test manager by the DUT to perform the tests and report results therefrom to the trusted verifier.

10. The method of claim 9, wherein the DUT comprises a private computer memory and wherein the tests are generated to include at least one test of the private computer memory and report results that are limited to indicia of success or failure of the at least one test.

11. The method of claim 9, wherein the DUT comprises a proprietary software application and wherein the tests are generated to include at least one test of the proprietary software application and report results that are limited to indicia of success or failure of the at least one test.

12. The method of claim 9, wherein the tests are generated to comprise at least one randomization of the tests therein, wherein the at least one randomization utilized to generate the tests is unknown to the DUT.

13. The method of claim 12, wherein the tests are generated to comprise the at least one randomization of an order of the test therein.

14. The method of claim 12, wherein the tests are generated to comprise the at least one randomization of a test attribute of at least one test.

15. The method of claim 9, wherein the tests comprise at least one test that further comprises a timing portion for the DUT to execute the at least one test and wherein the results include indicia of the time utilized to execute the at least one test.

16. A device under test (DUT), comprising:

a processor coupled with a computer memory comprising computer readable instructions;

a communication interface to a network;

a volatile memory; and a data storage;

wherein the processor performs:

upon being placed in communication with a trust verifier (TV), via the communication interface, accessing testable attributes of the DUT from the data storage and sending the testable attributes to the TV;

while in communication with the TV, and in response to sending the testable attributes to the TV, receiving from the TV tests and a test manager, loading the tests and the test manager into the volatile memory, executing the test manager, and returning test results to the TV; and upon receiving a signal from the test manager that the tests are finished, initiating at least one of a shutdown of the DUT or a reboot.

17. The DUT of claim 16, further comprising:

a data loader; and wherein the processor, in response to sending the testable attributes to the TV, executes the data loader to perform the loading of the tests and the test manager into the volatile memory and executing the test manager.

18. The DUT of claim 16, further comprising:

a private computer memory maintaining proprietary data; and wherein the processor provides at least one attribute of the private computer memory as a portion of the testable attributes; and wherein the test manager is generated to permit at least one test of the private computer memory and output test results exclusively limited to indicia of success or failure of the at least one test.

19. The DUT of claim 16, further comprising:

a private software application; and wherein the processor provides at least one attribute of the private software application as a portion of the testable attributes; and wherein the test manager is generated to permit at least one test of the private software application and output test results exclusively limited to indicia of success or failure of the at least one test.

20. The DUT of claim 16, wherein the processor receives indicia of pass or fail from the TV and, in accordance with the indicia of pass or fail, selectively enables or disables a function of the DUT.

21. A trust verification system for attesting whether a device under test (DUT) is trustworthy, comprising:

a processor coupled with a computer memory comprising computer readable instructions; and a communication interface; and wherein the processor performs:

upon being placed in communication with the DUT, via the communication interface, receiving testable attributes from the DUT;

generating, from the testable attributes, tests on the DUT, wherein the processor generates a script to comprise the tests, and the script is generated to comprise at least one randomization of the tests therein, wherein the at least one randomization utilized to generate the script is unknown to the DUT;

loading the tests into an executable memory of the DUT;

loading a test manager into the DUT;

signaling the test manager to execute the tests; and receiving results from the test manager executing the tests.

22. A method, comprising:

collecting testable attributes from a device under test (DUT);

generating, from the testable attributes, tests on the DUT, wherein the tests are generated to comprise at least one randomization of the tests therein, wherein the at least one randomization utilized to generate the tests is unknown to the DUT;

loading the tests into an executable memory of the DUT;

loading a test manager into the DUT; and executing the test manager by the DUT to perform the tests and report results therefrom.

* * * * *